United States Patent
Mueller et al.

(10) Patent No.: US 8,426,506 B2
(45) Date of Patent: Apr. 23, 2013

(54) CURABLE ORGANOPOLYSILOXANE COMPOSITIONS

(75) Inventors: Johann Mueller, Neuoetting (DE); Markus Merget, Mehring (DE); Klaus Schnitzer, Julbach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/579,496

(22) PCT Filed: Feb. 16, 2011

(86) PCT No.: PCT/EP2011/052318
§ 371 (c)(1),
(2), (4) Date: Aug. 16, 2012

(87) PCT Pub. No.: WO2011/101392
PCT Pub. Date: Aug. 25, 2011

(65) Prior Publication Data
US 2012/0322940 A1    Dec. 20, 2012

(30) Foreign Application Priority Data
Feb. 19, 2010 (DE) .......................... 10 2010 002 160

(51) Int. Cl.
*C08L 83/04* (2006.01)
*C08K 5/5415* (2006.01)

(52) U.S. Cl.
USPC ........... 524/265; 524/261; 524/306; 524/307; 524/308; 524/316; 528/15; 528/31; 528/32

(58) Field of Classification Search ........................ None
See application file for complete search history.

(56) References Cited

U.S. PATENT DOCUMENTS 6,586,551 B2   7/2003   Bohin et al.
8,110,647 B2 *  2/2012   Nickel et al. .................... 528/31

FOREIGN PATENT DOCUMENTS

EP    0 915 937 B1    4/2002
JP    2 053859 A      2/1990

* cited by examiner

*Primary Examiner* — Marc Zimmer
(74) *Attorney, Agent, or Firm* — Brooks Kushman P.C.

(57) ABSTRACT

Addition-crosslinkable silicone compositions having high adhesion, rapid curing, and reduced odor and extractables contain a silylated citric acid.

12 Claims, No Drawings

CURABLE ORGANOPOLYSILOXANE COMPOSITIONS

CROSS-REFERENCE TO RELATED APPLICATIONS

This application is the U.S. national phase of PCT Appln. No. PCT/EP2011/052318 filed Feb. 16, 2011, which claims priority to German Patent Application No. 10 2010 002 160.1 filed Feb. 19, 2010, which are incorporated herein by reference.

BACKGROUND OF THE INVENTION

1. Field of the Invention

The present invention relates to silicone compositions crosslinkable by addition of Si-bound hydrogen onto aliphatic multiple bonds and comprising silylated citric acid, to processes for the production of these compositions and to their use, in particular for coating textile fabrics.

2. Description of the Related Art

Addition-crosslinking silicone compositions cure by reaction of aliphatically unsaturated groups with Si-bound hydrogen (hydrosilylation) in the presence of a catalyst, typically a platinum compound. It is well known to use addition-crosslinking compositions for coating numerous substrates, such as plastics, metals, mineral materials and organic fibers. The individual constituents of the crosslinkable compositions have to be coordinated such that the requirements for industrial use can be met. Reference in this connection may be made to EP 915 937 B1 for example.

SUMMARY OF THE INVENTION

The present invention provides a silicone composition crosslinkable by addition of Si-bound hydrogen onto aliphatic multiple bonds, the compositions containing silylated citric acid.

DETAILED DESCRIPTION OF THE PREFERRED EMBODIMENTS

The crosslinkable compositions preferably comprise
(A) an organosilicon compound having an SiC-bound radical with aliphatic multiple bonding,
(B) an organosilicon compound having an Si-bound hydrogen atom or in lieu of (A) and (B)
(C) an organosilicon compound having an SiC-bound radical with aliphatic multiple bonding and an Si-bound hydrogen atom,
(D) a catalyst that promotes the addition of Si-bound hydrogen onto aliphatic multiple bonding, and
(E) trimethylsilylcitric acid, bistrimethylsilylcitric acid, tristrimethylsilylcitric acid or tetrakistrimethylsilylcitric acid.

As used herein, the term "organopolysiloxanes" shall comprehend polymeric, oligomeric and dimeric siloxanes wherein some of the silicon atoms may be bonded to each other through groups other than oxygen, as for example via —N— or —C—.

The compositions of the present invention may comprise one-component organopolysiloxane compositions and two-component organopolysiloxane compositions. In the latter case, the two components of the compositions of the present invention may contain all the constituents in any desired combination, generally with the proviso that one component does not simultaneously contain siloxanes having aliphatic multiple bonding, siloxanes having Si-bound hydrogen and a catalyst. The compositions of the present invention are preferably two-component compositions.

The compounds (A) and (B) or (C) employed in the compositions of the present invention are chosen, as is known, such that crosslinking is possible. Preferably, for example, compound (A) has at least two aliphatically unsaturated radicals and siloxane (B) at least three Si-bound hydrogen atoms, or compound (A) has at least three aliphatically unsaturated radicals and siloxane (B) at least two Si-bound hydrogen atoms, or alternatively siloxane (C) is used in place of compounds (A) and (B) and has aliphatically unsaturated radicals and Si-bound hydrogen atoms in the abovementioned ratios.

A useful organosilicon compound (A) is any organosilicon compound having aliphatic multiple bonding useful in addition-crosslinkable compositions.

The organosilicon compounds (A) preferably comprise siloxanes comprising units of the formula $$R_a R^1_b SiO_{(4-a-b)/2} \quad (I),$$

where
R in each occurrence may be the same or different and is a radical free of an aliphatic carbon-carbon multiple bond,
$R^1$ in each occurrence may be the same or different and is a univalent, optionally substituted, SiC-bound hydrocarbyl radical with aliphatic carbon-carbon multiple bonding,
a is 0, 1, 2 or 3, and
b is 0, 1 or 2,
with the proviso that the sum total of a+b is not more than 3 and there are at least 2 $R^1$ radicals per molecule.

The R radical may comprise uni- or polyvalent radicals, in which case the polyvalent radicals, such as bivalent, trivalent and tetravalent radicals, then bond a plurality of, such as for example two, three or four, siloxy units of the formula (I) together.

R comprises the univalent radicals —F, —Cl, —Br, —OR⁶, —CN, —SCN, —NCO and SiC-bonded, optionally substituted hydrocarbyl radicals, which may be interrupted by oxygen atoms or the group —C(O)—, and also bivalent radicals bonded on both sides to Si, as per formula (I).

When R comprises SiC-bound, substituted hydrocarbyl radicals, preferred substituents are halogen atoms, phosphorus-containing radicals, cyano radicals, —OR⁶, —NR⁶—, —NR⁶₂, —NR⁶—C(O)—NR⁶₂, —C(O)—NR⁶₂, —C(O)—R⁶, —C(O)OR⁶, —SO₂-Ph and —C₆F₅, where R⁶ can be the same or different and is a hydrogen atom or a univalent hydrocarbyl radical of 1 to 20 carbon atoms and Ph is phenyl.

Examples of R radicals are alkyl radicals such as methyl, ethyl, n-propyl, isopropyl, n-butyl, isobutyl, tert-butyl, n-pentyl, isopentyl, neopentyl, and tert-pentyl, hexylradicals such as n-hexyl, heptyl radicals such as n-heptyl, octyl radicals such as n-octyl and isooctyl such as 2,2,4-trimethylpentyl, nonyl radicals such as n-nonyl, decyl radicals such as n-decyl, dodecyl radicals such as n-dodecyl, and octadecyl radicals such as n-octadecyl; cycloalkylradicals such as cyclopentyl, cyclohexyl, cycloheptyl and methylcyclohexyl; aryl radicals, such as phenyl, naphthyl, anthryl and phenanthryl; alkaryl, such as o-, m-, p-tolyl, xylyl and ethylphenyl; and aralkyl radicals such as benzyl, α-phenylethyl and β-phenylethyl.

Examples of substituted R radicals are haloalkyl radicals such as 3,3,3-trifluoro-n-propyl, 2,2,2,2',2',2'-hexafluoroisopropyl and heptafluoroisopropyl, and also haloaryl radicals such as o-, m- and p-chlorophenyl.

The R radical preferably comprises a univalent, SiC-bound, optionally substituted hydrocarbyl radical of 1 to 18 carbon atoms which is free of aliphatic carbon-carbon multiple bonding, more preferably a univalent, SiC-bound hydrocarbyl radical of 1 to 6 carbon atoms which is free of aliphatic carbon-carbon multiple bonding, in particular methyl or phenyl.

The $R^1$ radical may comprise any desired groups accessible to an addition reaction (hydrosilylation) with an SiH-functional compound.

When $R^1$ comprises SiC-bound, substituted hydrocarbyl radicals, preferred substituents are halogen atoms, cyano radicals and —$OR^6$, where $R^6$ is as defined above.

$R^1$ preferably comprises alkenyl and alkynyl groups of 2 to 16 carbon atoms, such as vinyl, allyl, 1-propenyl, methallyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl and styryl, of which the use of vinyl, allyl and 5-hexenyl is particularly preferred.

The molecular weight of substituent (A) can vary within wide limits, for example between up to $10^6$ g/mol, although a molecular weight of 50 to 500,000 g/mol is preferred. Thus, constituent (A) may comprise for example a relatively low molecular weight alkenyl-functional oligosiloxane, such as 1,2-divinyltetramethyldisiloxane, but also a polydimethylsiloxane high polymer having chain-disposed and/or end-disposed Si-bound vinyl groups. Nor is the structure of the molecules forming constituent (A) fixed; more particularly, the structure of a comparatively high molecular weight, i.e., oligomeric or polymeric, siloxane may be linear, cyclic or branched.

Particular preference for use as component (A) is given to the use of essentially linear polydiorganosiloxanes having a viscosity of 20 to 1,000,000 mm²/s, very particular preference for use as component (A) being given to vinyl-terminated, essentially linear polydiorganosiloxanes having a viscosity of 50 to 500,000 mm²/s, all at 25° C.

The organosilicon compound (B) can be any hydrogen-functional organosilicon compound hitherto used in addition-crosslinkable compositions.

Preferred organopolysiloxanes (B), which have Si-bound hydrogen atoms, are organopolisiloxanes comprising units of the formula

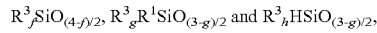  (II)

where
$R^2$ in each occurrence can be the same or different and has one of the meanings indicated above for R,
c is 0, 1, 2 or 3, and
d is 0, 1 or 2,
with the proviso that the sum total of c+d is not more than 3 and there are at least two and preferably at least three Si-bound hydrogen atoms per molecule.

Preferably, the organosilicon compound (B) used according to the present invention contains Si-bound hydrogen in the range from 0.04 to 1.7 weight percent, based on the total weight of the organosilicon compound (B).

The molecular weight of constituent (B) can likewise vary within wide limits, for example up to $10^6$ g/mol. For instance, constituent (B) may comprise for example a relatively low molecular weight SiH-functional oligosiloxane, such as tetramethyldisiloxane, or else a linear polysiloxane high polymer having chain-disposed or end-disposed SiH groups, or an SiH-containing silicone resin. Nor is the structure of the molecules forming the constituent (B) fixed; more particularly, the structure of a comparatively high molecular weight, i.e., oligomeric or polymeric, SiH-containing siloxane can be linear, cyclic or branched. Linear and cyclic polysiloxanes are preferably composed of units of the formula $R^2{}_3SiO_{1/2}$, $HR^2{}_2SiO_{1/2}$, $HR^2SiO_{2/2}$ and $R^2{}_2SiO_{2/2}$, where $R^2$ is as defined above.

Particular preference for use as component (B) is given to low molecular weight SiH-functional compounds, such as tetrakis-(dimethylsiloxy)silane and tetramethylcyclotetrasiloxane, and also comparatively high molecular weight, SiH-containing siloxanes, such as poly(hydromethyl)siloxane and poly(dimethyl/hydromethyl)siloxane having a viscosity at 25° C. of 10 to 10,000 mm²/s, or analogous SiH-containing compounds wherein some of the methyl groups are replaced by 3,3,3-trifluoropropyl or phenyl groups.

Constituent (B) is preferably present in the present invention's crosslinkable composition in such an amount that the molar ratio of SiH groups to aliphatically unsaturated groups is in the range from 0.1 to 20 and more preferably between 1.0 and 5.0.

The components (A) and (B) used according to the present invention are commercially available products or are obtainable by common chemical processes.

In lieu of components (A) and (B), the compositions of the present invention may include organopolysiloxanes (C) having not only aliphatic multiple bonds but also Si-bound hydrogen atoms, but this is not preferred.

When siloxanes (C) are used, they are preferably such as comprise units of the formula

where $R^3$ in each occurrence may be the same or different and has one of the meanings indicated for R and $R^1$ is as defined above,
f is 0, 1, 2 or 3,
g is 0, 1 or 2, and
h is 0, 1 or 2,
with the proviso that at least 2 $R^1$ radicals and at least 2 Si-bound hydrogen atoms are present per molecule.

Examples of organopolysiloxanes (C) are linear organopolysiloxanes consisting essentially of $R^3{}_2R^1SiO_{1/2}$—, $R^3{}_2SiO$— and $R^3HSiO$— units where $R^3$ and $R^1$ are each as defined above.

The organopolysiloxanes (C) preferably have an average viscosity of 20 to 1,000,000 mm²/s and more preferably 50 to 500,000 mm²/s, all at 25° C.

Organopolysiloxanes (C) are obtainable by common chemical methods.

Component (D) used according to the present invention can be any catalyst useful in compositions crosslinkable by addition of Si-bound hydrogen onto aliphatic multiple bonding.

Preferably, component (D) comprises hydrosilylation catalysts from group 8, 9 or 10 of the Periodic Table. This means that metals, and their compounds, such as platinum, rhodium, palladium, ruthenium and iridium, preferably platinum, can be used. The metals may if appropriate be fixed on finely divided support materials, such as activated carbon, metal oxides, alumina or silica.

Preferred hydrosilylation catalysts (D) are platinum and platinum compounds, more preferably such platinum compounds as are soluble in polyorganosiloxanes. Soluble platinum compounds include for example the platinum-olefin complexes of the formulae $(PtCl_2.olefin)_2$ and $H(PtCl_3.olefin)$, which preferably utilize alkenes of 2 to 8 carbon atoms, such as ethylene, propylene, isomers of butene and of octene, or cycloalkenes of 5 to 7 carbon atoms, such as cyclopentene, cyclohexene and cycloheptene. Useful soluble platinum catalysts further include the platinum-cyclopropane complex of the formula $(PtCl_2C_3H_6)_2$, the reaction products of hexachloroplatinic acid with alcohols, ethers and aldehydes or mixtures thereof, or the reaction product of hexachloroplatinic acid with methylvinylcyclotetra-siloxane in the presence of sodium carbonate in ethanolic solution. It is similarly possible to use platinum catalysts with phosphorus, sulfur and amine ligands, an example being $(Ph_3P)_2PtCl_2$. Particular preference for use as component (D) is given to complexes of platinum with vinylsiloxanes, such as sym-divinyltetramethyldisiloxane.

The amount of the hydrosilylation catalyst (D) used according to the present invention depends on the desired rate of crosslinking and on the particular use and also economic aspects. The compositions of the present invention preferably include platinum catalysts (D) in such amounts as to give a platinum content of 0.01 to 1000 weight ppm (=parts by weight per million parts by weight), more preferably 0.05 to 500 weight ppm and particularly 0.1 to 100 weight ppm, all based on the total weight of the composition of the present invention.

The substance (E) used according to the present invention comprises silylated citric acid.

Preferably, the silylated citric acid of the present invention is of the formula A-OC(COOA) $(CH_2COOA)_2$ (III), where A=H or $SiR_3$, with the proviso that at least one A has the meaning $SiR_3$ and R is a hydrocarbyl radical of preferably 1 to 10 carbon atoms, preferably 1 to 4 carbon atoms and more preferably of 1 to 2 carbon atoms.

Preferred silylated citric acids are trimethylsilylcitric acid, bistrimethylsilylcitric acid, tristrimethylsilylcitric acid or tetrakistrimethylsilylcitric acid, triethylsilylcitric acid, bistriethylsilylcitric acid, tristriethylsilylcitric acid, tetrakistriethylsilylcitric acid, tripropylsilylcitric acid, bistripropylsilylcitric acid, tristripropylsilylcitric acid, tetrakistripropylsilylcitric acid, tributylsilylcitric acid, bistributylsilylcitric acid, tristributylsilylcitric acid, and tetrakistributylsilylcitric acid, preference being given to trimethylsilylcitric acid, bistrimethylsilylcitric acid, tristrimethylsilylcitric acid, and tetrakistrimethylsilylcitric acid, particular preference being given to tetrakistrimethylsilylcitric acid.

Preferably, the substance (E) used according to the present invention is included in the compositions in amounts of 0.001 parts by weight to 10 parts by weight, more preferably 0.01 parts by weight to 5 parts by weight and most preferably 0.1 to 3 parts by weight, all based on 100 parts by weight of component (A).

In addition to the components (A) to (E), the curable compositions of the present invention may include any component hitherto used for producing addition-crosslinkable compositions, examples being inhibitors (F), fillers (G), adhesion promoters (H) and also further materials (I) selected from solvents, pigments, dyes, plasticizers, organic polymers, heat stabilizers and fragrances.

The optional inhibitors (F) are incorporated, if incorporated, to specifically adjust the pot life, light-off temperature and crosslinking rate of the present invention's compositions, examples being acetylenic alcohols such as 1-ethynyl-1-cyclohexanol, 2-methyl-3-butyn-2-ol, 3,5-dimethyl-1-hexyn-3-ol, 3-methyl-1-dodecyn-3-ol, trialkyl cyanurates, alkyl maleates such as diallyl maleates, dimethyl maleate and diethyl maleate, alkyl fumarates such as diallyl fumarate and diethyl fumarate, organic hydroperoxides such as cumene hydroperoxide, tert-butyl hydroperoxide and pinane hydroperoxide, organic peroxides, organic sulfoxides, organic amines, diamines and amides, phosphines and phosphites, nitriles, triazoles, diaziridines and oximes.

The inhibitors (F) which are optionally used according to the present invention preferably comprise ethynylcyclohexanol, 2-methyl-3-butyn-2-ol and alkyl maleates, of which ethynylcyclohexanol and 2-methyl-3-butyn-2-ol are particularly preferred.

The compositions of the present invention preferably include component (F) in amounts of 0.01 to 3 parts by weight, more preferably 0.02 to 1 part by weight and particularly 0.03 to 0.5 parts by weight, all based on 100 parts by weight of component (A).

The optional fillers (G) can be any fillers previously used in crosslinkable compositions. Examples of fillers are reinforcing fillers, i.e., fillers having a BET surface area of at least 30 $m^2/g$, for example carbon blacks, fumed silica, precipitated silica and silicon-aluminum mixed oxides, which fillers may be in a hydrophobicized state, and also nonreinforcing fillers, i.e., fillers having a BET surface area of less than 30 $m^2/g$, for example powders of quartz, crystobalite, diatomaceous earth, calcium silicate, zirconium silicate, montmorillonites such as bentonites, zeolites including molecular sieves such as sodium aluminosilicates, metal oxides such as aluminum oxide, zinc oxide or mixed oxides thereof, metal hydroxides such as aluminum hydroxide, barium sulfate, calcium carbonate, gypsum, silicon nitride, silicon carbide, boron nitride, powders of glass, of carbon or of plastic, and microballoons of glass or of plastic.

The filler (G) preferably comprises fumed silicas or precipitated silicas, particular preference being given to fumed silica having a BET surface area in the range from 30 to 300 $m^2/g$.

When the compositions of the present invention include fillers (G), which is preferred, the amounts involved preferably range from 1 to 50 parts by weight and more preferably from 2 to 30 parts by weight, all based on 100 parts by weight of crosslinkable composition.

Adhesion promoters (H) for inclusion in the present invention's compositions when appropriate can be any adhesion promoters useful in compositions crosslinkable by addition of Si-bound hydrogen onto aliphatic multiple bonding. They are preferably silane adhesion promoters, examples being vinyltrialkoxysilanes, methacryloyloxypropyltrialkoxysilanes, epoxypropyltrialkoxysilanes, silanes having acetoxy groups and also mixtures thereof.

It is particularly preferred for the adhesion promoters (H) used according to the present invention to be epoxypropyltriethoxysilane, epoxypropyltrimethoxysilane and vinyl-triacetoxysilane.

When the compositions of the present invention include adhesion promoters (H) which is preferred, the amounts involved preferably range from 0.01 to 20 parts by weight, more preferably from 0.05 to 10 parts by weight and particularly from 0.1 to 5 parts by weight, all based on 100 parts by weight of component (A).

Further materials (I) used in the present invention's compositions where appropriate may be any solvent, pigment, dye, plasticizer, organic polymer, heat stabilizer or scent known for that purpose, useful in compositions crosslinkable by addition of Si-bound hydrogen onto aliphatic multiple bonding and different than components (A) to (H).

Examples of solvents are aliphatics having 7 to 20 carbon atoms, toluene, xylene, acid esters, for example ethyl acetate, or ketones, such as methyl ethyl ketone.

Examples of plasticizers are nonfunctional trimethyl-terminated polydimethylsiloxanes, aliphatics having 15 to 30 carbon atoms and nonfunctional methylphenylpolysiloxanes.

Examples of organic polymers are polyacrylates, polyurethanes, polyacrylonitrile, polycarbonates, and polyesters.

Examples of heat stabilizers are cerium oxides, organic cerium compounds such as cerium octoate, iron oxides, and titanium oxides.

When the present invention's compositions include further materials (I), these further materials (I) preferably comprise solvents such as aliphatic benzines, toluene, xylene or acid esters, such as ethyl acetate.

When the present invention's compositions include further materials (I), which is not preferred, the amounts involved preferably range from 0.01 to 60 parts by weight, more preferably from 0.05 to 50 parts by weight and particularly from 0.1 to 30 parts by weight, all based on 100 parts by weight of component (A).

The compositions of the present invention are preferably liquid or pourable at room temperature and ambient pressure. Their viscosity is preferably in the range from 20 to 1,000,000 mm$^2$/s and more preferably in the range from 50 to 500,000 mm$^2$/s, all at 25° C.

The compositions of the present invention preferably consist of
(A) an organosilicon compound comprising a unit of the formula (I),
(B) an organopolysiloxane having an Si-bound hydrogen atom,
(C) a catalyst that promotes the addition of Si-bound hydrogen onto aliphatic multiple bonding,
(D) silylated citric acid of formula (III), preferably trimethylsilylcitric acid, bistrimethylsilylcitric acid, tristrimethylsilylcitric acid or tetrakistrimethylsilylcitric acid,
(E) an inhibitor,
if appropriate
(F) a filler,
if appropriate
(G) an adhesion promoter and
if appropriate
(H) further materials other than said components (A) to (H) and selected from solvents, pigments, dyes, plasticizers, organic polymers, heat stabilizers and scents.

More particularly, the compositions of the present invention consist of
(A) vinyl-terminated diorganopolysiloxanes,
(B) organopolysiloxanes having Si-bound hydrogen atoms,
(D) catalysts promoting the addition of Si-bound hydrogen onto aliphatic multiple bonding,
(E) silylated citric acid of formula (III), preferably trimethylsilylcitric acid, bistrimethylsilylcitric acid, tristrimethylsilylcitric acid or tetrakistrimethylsilylcitric acid,
(F) inhibitors,
(G) fillers,
(H) silane adhesion promoters
and also
if appropriate
(I) further materials other than said components (A) to (H) and selected from solvents, pigments, dyes, plasticizers, organic polymers, heat stabilizers, nonreinforcing fillers or scents.

The components (A) to (I) used according to the present invention may each comprise a single kind of such a component as well as a mixture of at least two different kinds of such a component.

The organopolysiloxane compositions of the present invention can be produced according to known processes, for example by uniformly mixing the individual components together in any desired order.

Depending on the consistency and viscosity of the components used, the mixing operation can be effected using simple stirred equipment, examples being vane stirrers, planetary mixers, turbostirrers or dissolvers, in roll mills, kneaders, Z-mixers or ball mills. The stirred vessel can be open or closed. The mixing step is preferably carried out at room temperature, but temperatures in the range from −40° C. to 150° C. are also possible. The acid (E) used according to the present invention may be mixed into the silicone rubber formulation already containing all the other components, or into one or more of the corresponding premixes. Similarly, the component E may be incorporated during the production of the silicone rubber mixture. If desired, the component (E) can also be used in admixture with solvents.

The mixing step to produce the compositions of the present invention is preferably carried out at the pressure of the ambient atmosphere, i.e., about 900 to 1100 hPa, although, if desired, an elevated or reduced pressure and also protective gas can be employed. When the organic acid (E) used according to the present invention is added in admixture with solvent, the solvent can be removed again if desired by applying a vacuum and/or raising the mixing temperature.

The mixing operation to produce the compositions of the present invention can be carried out batchwise or else continuously in equipment suitable for the purpose. Examples of such equipment are Buss kneaders and also static or dynamic in-line mixers.

The compositions of the present invention, which are crosslinkable by addition of Si-bound hydrogen onto aliphatic multiple bonding, can be allowed to crosslink under the same conditions as the prior art compositions crosslinkable by hydrosilylation reaction. Preferably the temperature ranges from 100 to 220° C. and more preferably from 130 to 190° C., and the pressure from 900 to 1100 hPa. However, higher or lower temperatures and pressures can also be employed.

The present invention further provides shaped articles obtained by crosslinking the compositions of the present invention. The shaped articles of the present invention can be obtained in any desired manner known per se. Examples thereof are calendering, compression molding, injection molding, extrusion, and casting.

The compositions of the present invention can also be used for coating surfaces.

The compositions of the present invention and also the crosslinked products obtained therefrom can be used for any purpose for which elastomers or organopolysiloxane compositions crosslinkable to elastomers are useful. More particularly, the compositions of the present invention are useful for coating textile fabrics, examples being wovens, nonwovens, drawn-loop knits, laid scrims, formed-loop knits, felts or warp knits. The textile fabrics may be fabricated from natural fibers, such as cotton, wool, silk, etc. or else from manufactured fibers such as polyester, polyamide, aramid, etc. The textiles may also be fabricated from mineral fibers, such as glass or silicates or metal fibers. The compositions of the present invention are also useful for coating foils or surfaces composed of mineral materials, plastics, natural materials or metals.

The present invention further provides a process for coating a textile fabric, which comprises the composition of the present invention being applied to the textile fabric and allowed to crosslink.

The coating according to the present invention can be applied in a conventional manner, for example blade coating, dip coating, extrusion processes, squirting or spraying processes. Similarly, all varieties of roller coatings, such as gravure rolls, padding or application via multiroll systems and also screen printing are possible.

The coating according to the present invention is preferably carried out at temperatures in the range from 10 to 50° C. and at a pressure of the ambient atmosphere, i.e., about 900 to 1100 hPa.

The compositions of the present invention are also useful for laminating and for processing in the transfer process.

The textile fabrics coated with the compositions of the present invention can be used wherever coated wovens are useful. The coated wovens of the present invention are preferably used where particularly odor-neutral coatings having low emission values and good adhesion to the substrate are required. Examples thereof are bellow expansion joints for public means of transport or public buildings, curtains, light-protective textiles, awnings or safety restraint systems in automobiles.

The crosslinkable compositions of the present invention have the advantage of being obtainable in a simple process from readily available starting materials and hence of being obtainable in an economical manner.

The crosslinkable compositions of the present invention have the further advantages of good stability in storage, being simple to process in customary equipment, having reduced emission values, and reduced intrinsic odor.

The process of the present invention has the advantage that increased rates of processing speed are possible.

In the examples described hereinbelow, all parts and percentages are by weight, unless otherwise stated. Again, unless otherwise stated, the examples which follow are carried out at a pressure of the ambient atmosphere, i.e., about 1000 hPa, and at room temperature, i.e., at about 20° C., or at a temperature which autogenously results on combining the reactants at room temperature without additional heating or cooling.

The synthesis of tetrakistrimethylsilylcitric acid is carried out as follows:

20.0 g of citric acid (anhydrous) are dissolved in 150 g of tetrahydrofurane and the resulting mixture is heated to 80° C. 50.4 g of hexamethyldisilazane are added during 30 min. The reaction mixture is stirred for 4 h. Thereafter the volatiles are distilled off in a rotary evaporator at 80° C. and 10 mbar to obtain 46.8 g of target compound as an easily mobile liquid (yield: 93%, purity: 97% by GC). $^1$H NMR (CDCl3): 0.12 ppm [9 H, C—OSi(CH$_3$)$_3$]; 0.26 [18 H, C(O)OSi(CH$_3$)$_3$, terminal]; 0.28 [9 H, C(O)OSi(CH$_3$)$_3$, intern]. 29Si—NMR (CDCl3): 12.5 ppm; 23.0; 25.4.

Trimethylsilylcitric acid, bistrimethylsilylcitric acid and tristrimethylsilylcitric acid are prepared by the same method by altering the stoichiometry.

In the context of the present invention and unless specifically directed otherwise, all quantitative and percent indications are by weight and all percentage indications are based on total weight, all temperatures are 20° C. and all pressures are at the corresponding ambient atmosphere, i.e., 900 to 1100 hPa. All viscosities are determined at 25° C.

In the examples hereinbelow, all parts and percentages are by weight, unless otherwise stated. Again, unless otherwise stated, the examples which follow are carried out at a pressure of the ambient atmosphere, i.e. about 1000 hPa, and at room temperature, i.e. at about 20° C., or at a temperature which autogenously results on combining the reactants at room temperature without additional heating or cooling. All viscosities in the examples are measured at 25° C.

EXAMPLE 1

Production of an Addition-Crosslinking Base Composition (Hereinafter Referred to as "Base Composition")

120 g of an α,ω vinyldimethysiloxy-terminated polydimethyl-siloxane having a viscosity of 20,000 mPa·s are mixed with 156 g of an α,ω vinyldimethysiloxy-terminated polydimethylsiloxane having a viscosity of 1000 mPa·s and 55 g of a finely divided silica having a BET surface area of 300 g/m$^2$.

This mixture has incorporated into it 0.06 g of a platinum-divinyltetramethylsiloxane complex dissolved in dimethylpoly-siloxane so that a platinum content of 18 ppm is present in the composition, 10 g of methylhydropolysiloxane having trimethyl end groups and a viscosity of 45 mPa·s, and 1.5 g of ethynyl-cyclohexanol.

100 g of the base composition thus produced is admixed with 1 g of tetrakistrimethylsilylcitric acid.

EXAMPLE 2

100 g of the base composition produced in Example 1 is admixed with 2 g of tetrakistrimethylsilylcitric acid.

EXAMPLE 3

100 g of the base composition of Example 1 is admixed with 1 g of tristrimethylsilylcitric acid.

EXAMPLE 4

To 100 g of the base composition of Example 1 is admixed with 2 g of trimethylsilylcitric acid.

EXAMPLE 5

Determination of Vulcanization Time Needed at a Vulcanization Temperature of 180° C.

The mixtures as per Examples 1 to 4 and also the base composition as such for comparison (Comparative Example 1 (C1)) are each blade coated onto a woven nylon-6,6 fabric and vulcanized at 180° C.

The fabric thus coated is subjected to the extraction test and the residence time needed until extractables <10% is determined as described hereinbelow.

The extractables content of the crosslinked silicone rubber was determined as an indicator of the vulcanization status. To this end, a coated fabric is stored in methyl isobutyl ketone for 24 hours and the silicone content of the solvent is determined.

The vulcanization time needed to reach 10% extractables was determined. The results are given in Table 1.

TABLE 1

| | |
|---|---|
| Coating of Comparative Example 1 | 46 seconds |
| Coating of Example 1 | 13 seconds |
| Coating of Example 2 | 15 seconds |
| Coating of Example 3 | 19 seconds |
| Coating of Example 4 | 18 seconds |

EXAMPLE 6

Determination of Odor Evolution After Coating

The mixtures as per Examples 1 to 4 and also the base composition as such for comparison (Comparative Example 1) are each blade coated onto a woven loom-state, unwashed nylon-6,6 fabric and vulcanized at 180° C. for 60 seconds.

Fabrics coated with the inventive composition exhibit distinctly reduced odor in the odor test described hereinbelow.

100 cm² of the coated fabric was in each case placed in a jar and stored sealed for 24 hours. The jars were then opened and the odor assessed. The results are to be found in Table 2.

TABLE 2

| Coating of Comparative Example C1 | Strong, fishy odor |
|---|---|
| Coating of Example 1 | No detectable odor |
| Coating of Example 2 | No detectable odor |
| Coating of Example 3 | Weak odor, distinctly less than for C1 |
| Coating of Example 4 | Weak odor, distinctly less than for C1 |

EXAMPLE 7

Determination of Adhesion of Coating to Substrate

The mixtures as per Examples 1 to 4 and also the base composition as such for comparison (Comparative Example 1) are each blade coated onto a washed woven nylon-6,6 fabric and vulcanized at 180° C. for 30 seconds.

Fabrics coated with the inventive composition exhibit distinctly better values in the ISO 5981 test.

The coated fabric samples are each tested to ISO 5981 by coated fabric samples being moved diagonally in the opposite direction in a scrub tester under a metal pressure shoe and a 1 kg added weight. The results are to be found in Table 3.

TABLE 3

| Coating of Comparative Example 1 | 200 scrubs |
|---|---|
| Coating of Example 1 | 1800 scrubs |
| Coating of Example 2 | 1600 scrubs |
| Coating of Example 3 | 1400 scrubs |
| Coating of Example 4 | 1400 scrubs |

EXAMPLE 8

The mixtures as per Examples 1 to 4 and also the base composition as such for comparison (Comparative Example 1) are each blade coated onto a washed woven nylon-6,6 fabric and vulcanized at various temperatures for 30 seconds.

Fabrics coated with the inventive composition require short vulcanization times.

Extractables were again determined as an indicator of the quality of crosslinking. Each of the coated fabric samples was subjected to the extraction test described in Example 5. Table 4 shows the temperature needed to achieve an extract value of below 10% within 30 seconds.

TABLE 4

| Coating of Comparative Example 1 | 185° C. |
|---|---|
| Coating of Example 1 | 152° C. |
| Coating of Example 2 | 154° C. |
| Coating of Example 3 | 158° C. |
| Coating of Example 4 | 161° C. |

EXAMPLE 9

Determination of Emissions (Volatiles) in the Coated Fabrics

The mixtures as per Examples 1 to 4 and also the base composition as such for comparison (Comparative Example 1) are each blade coated onto a woven nylon-6,6 fabric and vulcanized at 180° C. for 1 minute.

Fabrics coated with the inventive composition exhibit distinctly reduced emission values.

The emissions from the fabric samples were determined to VDA 277/278 by determining the volatile fractions (as total carbon) with the aid of a GC-MS coupling by the thermodesorption process. The results are to be found in Table 5.

TABLE 5

| Coating of Comparative Example 1 | 124 ppm |
|---|---|
| Coating of Example 1 | 28 ppm |
| Coating of Example 2 | 19 ppm |
| Coating of Example 3 | 36 ppm |
| Coating of Example 4 | 37 ppm |

What is claimed is:

1. A crosslinkable silicone composition crosslinkable by addition of Si-bound hydrogen onto aliphatic carbon-carbon multiple bonds, comprising silylated citric acid.

2. The crosslinkable composition of claim 1 wherein the silylated citric acid is of the formula $$A\text{-}OC(COOA)(CH_2COOA)_2 \tag{III}$$

where A is H or $SiR_3$, with the proviso that at least one A is $SiR_3$ where R is a hydrocarbyl radical of 1 to 10 carbon atoms.

3. The crosslinkable composition of claim 1, wherein at least one silylated citric acid is selected from the group consisting of trimethylsilylcitric acid, bistrimethylsilylcitric acid, tristrimethylsilylcitric acid, and tetrakistrimethylsilylcitric acid.

4. The crosslinkable composition of claim 1, comprising:
(A) an organosilicon compound having at least one SiC-bound radical with aliphatic carbon-carbon multiple bonds, and
(B) an organosilicon compound having at least one Si-bound hydrogen atom, or in lieu of or in addition to (A) and (B),
(C) an organosilicon compound having at least one SiC-bound radical with aliphatic carbon-carbon multiple bonds and at least one Si-bound hydrogen atom,
(D) a catalyst that promotes the addition of Si-bound hydrogen onto aliphatic carbon-carbon multiple bonds, and
(E) a silylated citric acid of the formula (III)

$$A\text{-}OC(COOA)(CH_2COOA)_2 \tag{III}$$

where A is H or $SiR_3$, with the proviso that at least one A is $SiR_3$ where R is a hydrocarbyl radical of 1 to 10 carbon atoms.

5. The crosslinkable composition of claim 4, wherein at least one organosilicon compound (A) is a siloxane comprising at least one unit of the formula $$R_aR^1_bSiO_{(4-a-b)/2} \tag{II}$$

where
R each individually is a radical free of aliphatic carbon-carbon multiple bonds,
$R^1$ is a univalent, optionally substituted, SiC-bound hydrocarbyl radical with aliphatic carbon-carbon multiple bonding,
a is 0, 1, 2 or 3, and
b is 0, 1 or 2,
with the proviso that the sum total of a+b is not more than 3 and there are at least 2 $R^1$ radicals per molecule.

6. The crosslinkable composition of claim 1, consisting of
(A) at least one organosilicon compound comprising a unit of the formula (II), $$R_aR^1_bSiO_{(4-a-b)/2} \tag{II}$$

where

R each individually is a radical free of aliphatic carbon-carbon multiple bonds, $R^1$ is a univalent, optionally substituted, SiC-bound hydrocarbyl radical with aliphatic carbon-carbon multiple bonding, a is 0, 1, 2 or 3, and b is 0, 1 or 2, with the proviso that the sum total of a+b is not more than 3 and there are at least 2 $R^1$ radicals per molecule.

(B) an organopolysiloxane having at least one Si-bound hydrogen atom, (D) a catalyst that promotes the addition of Si-bound hydrogen onto aliphatic multiple bonding, (E) at least one silylated citric acid of formula (III), $$A\text{-}OC(COOA)(CH_2COOA)_2 \qquad (III),$$

where A is H or $SiR_3$, with the proviso that at least one A is $SiR_3$, where R is a hydrocarbyl radical of 1 to 10 carbon atoms, (F) optionally, one or more inhibitors, (G) optionally, one or more fillers, (H) optionally, one or more adhesion promoters, and (I) optionally, further materials other than components (A) to (H) selected from the group consisting of solvents, pigments, dyes, plasticizers, organic polymers, heat stabilizers, and fragrances.

7. A shaped article obtained by crosslinking a crosslinkable composition of claim 1.

8. A shaped article obtained by crosslinking a crosslinkable composition of claim 5.

9. A shaped article obtained by crosslinking a crosslinkable composition of claim 6.

10. A process for coating a textile fabric, comprising: applying a crosslinkable composition of claim 1 to the textile fabric and crosslinking the composition.

11. A process for coating a textile fabric, comprising: applying a crosslinkable composition of claim 5 to the textile fabric and crosslinking the composition.

12. A process for coating a textile fabric, comprising: applying a crosslinkable composition of claim 6 to the textile fabric and crosslinking the composition.

* * * * *